Sept. 15, 1931.    P. H. DOHRN    1,823,789
TRANSPLANTING IMPLEMENT
Filed April 16, 1929    2 Sheets-Sheet 1

Sept. 15, 1931.   P. H. DOHRN   1,823,789
TRANSPLANTING IMPLEMENT
Filed April 16, 1929   2 Sheets-Sheet 2
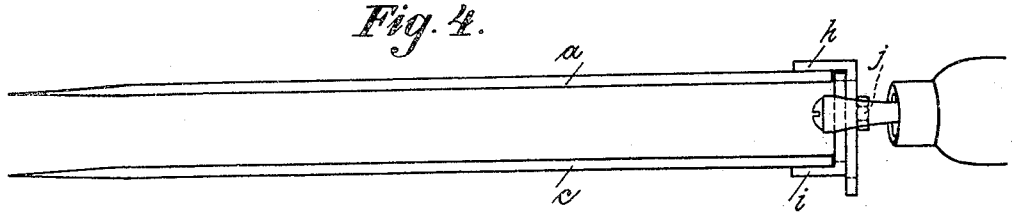
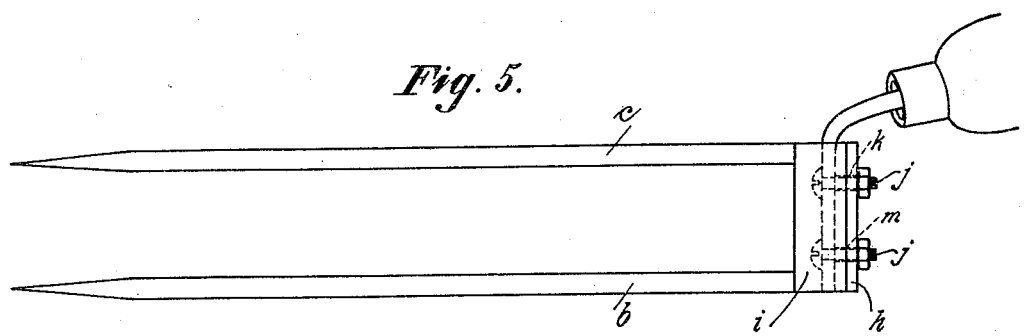
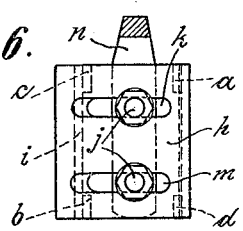
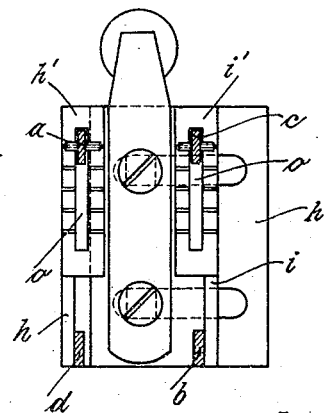
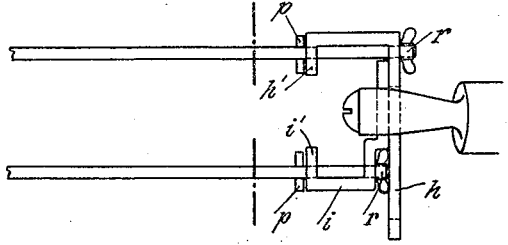

Patented Sept. 15, 1931

1,823,789

UNITED STATES PATENT OFFICE

PETER HERMANN DOHRN, OF WESSELBUREN, GERMANY

TRANSPLANTING IMPLEMENT

Application filed April 16, 1929, Serial No. 355,576, and in Germany April 19, 1928.

This invention refers to a forklike implement adapted to be used in connection with transplanting plants, particularly small or young plants standing in rows. This implement or fork may be made of steel or other suitable material and comprises three, four or more prongs attached to a handle. Smaller forks are provided with three prongs and a comparatively small handle, while the larger forks are given a larger number of prongs and a long handle to hold it with both hands. When there are four prongs, these are arranged to encompass a rectangle or trapezium, while the three prongs of smaller forks are triangularly distributed. The number and lengths of the prongs depend on the circumstances and the purpose for which the fork is to be used. The same is true with regard to the shape of the prongs, which may be round or square or more or less flat and may be perfectly straight or more or less flexed.

Fig. 4 is an upper view of a modified fork, the prongs being adapted to be laterally adjusted.

Fig. 5 is an elevation of the fork shown in Fig. 4.

Fig. 6 is an end view of the fork shown in Figures 4 and 5.

Fig. 7 is an upper view and

Fig. 8 an end view of another modification.

Figure 1:
Fig. 1 illustrates a transplanting fork having three prongs.

The fork shown in Fig. 1 is provided with three prongs, $a$, $b$ and $c$ attached to a handle $f$ of comparatively short length to adapt the implement to be held by one hand. When piercing into the earth on both sides of the plants two prongs $a$ and $c$ engage the plants on the two sides and the third $b$ under the plants in a vertical level intermediate the levels of the prongs $a$ and $c$.

Figure 2:
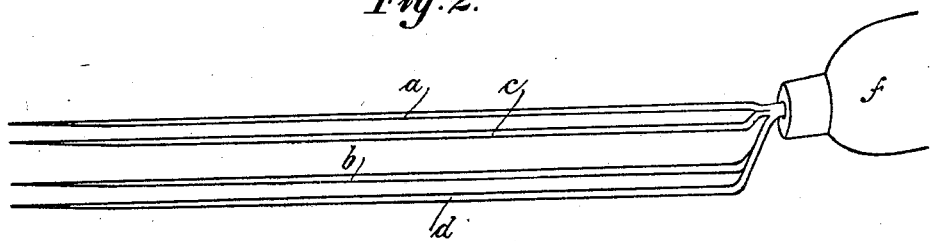
Figs. 2 and 3 are perspective views of a transplanting fork of a larger design, having four prongs.
Figure 3:
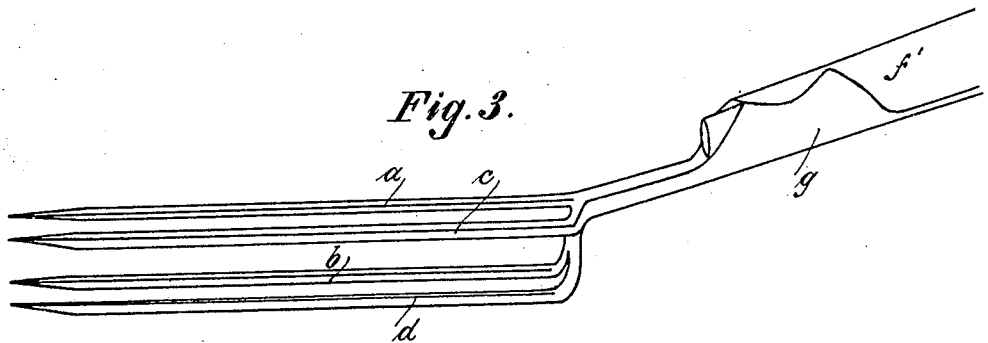

The forks shown in Figures 2 and 3 being provided with four prongs $a$, $b$, $c$ and $d$ are designed for heavier work the prong $c$ being situated opposite $a$ and $d$ opposite $b$. Particularly the fork shown in Fig. 3 may be used for transplanting larger plants, the prongs being square in cross-section, while in the first two constructions the prongs are taken to be round. Also the handle is preferably longer for enabling it to be gripped by both hands. For particularly heavy work the prongs may be made in one piece with a socket $g$, into which a long stick or handle $f'$ may fit, eventually nailed thereto in well known manner.

The implement is well adapted to transplant long rows of plants by a single grip so as to enable of performing work three to five times as quick as when the plants are transplanted singly. When transplanting in rows the roots of the delicate plants can only be injured or torn on two sides, while on the two other sides, situated within the row, the roots are fully well protected and can grow further without being disturbed. The distance between the prongs as well as the size and length of the fork is made to suit to the size and amount of the plants.

The implement is pierced into the soil from the side of the bed or the like, that is from the end of a row of plants in such manner, that the roots are gripped from the sides and from below. By turning and sidewise lifting the fork the plants are then elevated in a row and then laid down in a similar manner into a groove or channel previously prepared. In this way those parts of the plants, which are above the ground, are not touched at all and therefore remain perfectly uninjured. Even in cases, where the plants are not intended to be planted again in a row, the taking out in a row is of great advantage, because the single plants can be separated from one another with greater facility and quicker and perfectly uninjured.

Eventually it may be of advantage to transplant only every second row and allow half of the plants of a field to remain in the ground, thus giving them opportunity to develop themselves in twice as much space than heretofore. The grooves created hereby may be filled by the same fork with nourishing earth eventually mixed with manure.

It may be of advantage to make the prongs adjustable for adapting the fork for different breadths of rows and different large plants. Modifications enabling adjustment of this description are shown in Figs. 4 to 8. Two angles $h$ and $i$ provided with slots $k$ and $m$ are connected by bolts $j$ with a plate or bar $n$, to which the handle $f$ or socket $g$ respectively is fastened. The prongs $a$ and $d$ are connected by weld or the like with one angle $h$ and the prongs $c$ and $b$ with the other angle $i$. When it is desired to adjust the implement for smaller or larger plants, the bolts $j$ are loosened and the angles shifted against one another in one direction or the other, as the case may be, and then the bolts screwed tight again.

In horticulture or gardening, where many different kinds of plants are cultivated, it may be of advantage to adjust the fork also as to height. In such case it is advisable to make the upper prongs so adjustable. A construction to enable such adjustment is shown in Figs. 7 and 8.

The angles $h$ and $i$ are provided for somewhat over half of their height with flanges $h'$ and $i'$ respectively, provided with a longitudinal vertical slot $o$, a similar slot being arranged on the back of the angles opposite the slot $o$. The breadth of the slots corresponds to the thickness of the prongs $a$ and $c$, which project therethrough, and are provided with cross-pins $p$ close to the flanges $h'$ and $i'$, and preferably having a knife-edge bearing thereagainst. The ends of the prongs $a$ and $c$ are rounded and threaded to be engaged by nuts $r$ the angle $i$ being joggled to give room to the nut between the two angles. The outer faces of the flanges $h'$ and $i'$ are serrated or provided with notches $s$ which, if at equal distances apart, may form a kind of scale for determining the adjustment of the prongs as to height. These notches serve for engagement of the pins $p$, when the nuts $r$ are screwed tight, to firmly grasp the prong when adjusted.

I claim:—

1. A transplanting implement comprising a handle, two sets of prongs mounted in parallel planes, and two angles on each of which a prong of each of the two sets is mounted, which angles are adjustably attached to said handle.

2. A transplanting implement comprising a handle, two sets of prongs mounted in parallel planes, and two angles on each of which a prong of each of the two sets is mounted, which angles are adjustably attached to said handle in lateral direction, the prongs of one of the sets being moreover attached in a direction arranged at right angles to the said lateral direction and adjustably to said angles.

3. As a separate article of manufacture for hand use, a complete implement for transplanting a plurality of plants arranged in a row, comprising a plurality of rows of elongated prongs, mounted on a single handle, the said prongs being fixed both with respect to the handle and to each other at least one of the last-mentioned rows comprising at least two, substantially parallel prongs, the said rows of prongs lying in substantially parallel planes.

4. As a separate article of manufacture for hand use, a complete implement for transplanting a plurality of plants arranged in a row, comprising a handle, a plurality of rows of elongated prongs in superposed, substantially parallel planes, mounted integrally with respect to each other and to the said handle, at least the uppermost one of the rows of prongs comprising at least two parallel prongs.

5. As a separate article of manufacture for hand use, a complete implement for transplanting a plurality of plants arranged in a row comprising a plurality of rows of unobstructed elongated prongs, mounted on a single handle, the said prongs being fixed both with respect to the handle and to each other, each row comprising at least two prongs, the said rows of prongs lying in substantially parallel planes.

6. As a separate article of manufacture for hand use, a complete implement for transplanting a plurality of plants arranged in a row comprising a handle, a plurality of rows of elongated prongs mounted integrally on said handle, the prongs being fixed with respect to each other each row comprising at least two prongs, the said rows of prongs lying in substantially parallel planes, the corresponding prongs of each row lying in substantially the same plane, the said planes being substantially parallel.

7. An implement for transplanting a plurality of plants arranged in a row, comprising a handle, and a plurality of rows of elongated prongs, at least one of the said rows of prongs comprising at least two substantially parallel prongs, the said rows of prongs lying in substantially parallel planes and one of the said rows being offset with respect to the said handle.

8. An implement for transplanting a plurality of plants arranged in a row, comprising a handle, and a plurality of rows of elongated prongs, at least one of the said rows comprising at least two substantially parallel prongs, the said rows of prongs lying in substantially parallel planes and one of the said rows being offset with respect to the said handle, the said prongs being substantially immovable with respect both to each other and to the handle when the said implement is assembled for operation.

9. The process of transplanting plants laid in rows comprising simultaneously cutting away the soil around the roots and sides of several adjacent plants in a row and mechanically gripping the plants adjacent the sides and bottom thereof, then transferring the plants while so held to their new habitat.

In testimony whereof I have signed my name to this specification.

PETER HERMANN DOHRN.